United States Patent [19]

Moldovansky et al.

[11] Patent Number: 5,504,779
[45] Date of Patent: Apr. 2, 1996

[54] REDUNDANCY MODEM

[75] Inventors: Anatoly Moldovansky, South Euclid; Mark F. Pieronek, Garfield Heights, both of Ohio

[73] Assignee: Reliance Electric Industrial Company, Cleveland, Ohio

[21] Appl. No.: 985,330

[22] Filed: Dec. 4, 1992

[51] Int. Cl.[6] .................................................. H04B 3/46
[52] U.S. Cl. .......................... 375/224; 375/222; 375/257; 370/13; 455/62; 455/67.1
[58] Field of Search ...................................... 375/219, 222, 375/224, 257, 260, 377; 370/85.1, 85.9, 13, 16; 379/93, 97–98; 340/825.03, 825.04, 825.16; 455/62–63, 67.1; 371/8.2, 11.2

[56] References Cited

U.S. PATENT DOCUMENTS

| | | | |
|---|---|---|---|
| 3,444,516 | 8/1966 | Lechleider | 375/267 |
| 4,663,768 | 5/1987 | Ryu | 375/211 |
| 5,097,484 | 3/1992 | Akaiwa | 375/267 |
| 5,203,027 | 4/1993 | Nounin et al. | 375/231 |
| 5,241,565 | 8/1993 | Kloc et al. | 375/222 |
| 5,291,519 | 3/1994 | Tsurumaru | 375/230 |

*Primary Examiner*—Young T. Tse
*Attorney, Agent, or Firm*—James A. Hudak; John J. Horn; George A. Montanye

[57] ABSTRACT

A communication system providing for the duplication of data and information transmission between programmable controllers is disclosed. A modem is provided for each programmable controller and each processor within a programmable controller in the system, and the modems are interconnected by pairs of coaxial cables. Each transmission from a programmable controller or processor within a programmable controller is simultaneously transmitted via its associated modem over both cables to all of the other programmable controllers and processors within programmable controllers in the system. The receiving modems select the data or information from one of the cables, based on the integrity of the data being received, and transmit same to its associated programmable controller or processor within a programmable controller.

5 Claims, 3 Drawing Sheets

5,504,779

REDUNDANCY MODEM

TECHNICAL FIELD

The present invention relates, in general, to a communication system for a plurality of programmable controllers and, more particularly, to a communication system which duplicates the transmission of data or information to and from a plurality of controllers via a plurality of coaxial cables thus ensuring the integrity of the data or information transmitted between same.

BACKGROUND ART

Numerous approaches are available to facilitate communication between programmable controllers or the like within a communication network. Some approaches utilize a communication topology wherein the programmable controllers are interconnected in a network having a ring configuration. With such a topology, if a fault occurs in a cable interconnecting the programmable controllers, the direction of communication is reversed so that communication is maintained via the other cables within the communication ring. For example, if communication is occurring in a clockwise direction between two programmable controllers in such a ring configuration and a fault occurs in one of the cables interconnecting same, communication automatically reverts to the counter-clockwise direction causing the data or information to pass through the cables which interconnect the other programmable controllers within the communication ring.

Another approach which ensures the continuity of communication between programmable controllers in a communication network involves the utilization of a plurality of cables to interconnect the controllers. Such approaches typically require the simultaneous communication over both the cables and the comparison of the incoming signals at the receiving programmable controller to determine which incoming signal should be selected. In this case, each incoming signal is typically compared against a preset value, and the signal which exceeds the preset value by a predetermined amount is selected. Alternatively, the signals can be compared against one another and the "stronger" signal selected. Since the incoming signal is not analyzed as to data integrity and/or the presence of noise, the possibility of forwarding faulty data or information to a receiving programmable controller exists.

In view of the foregoing, it has become desirable to develop a communication system which utilizes simultaneous communication over a plurality of cables and which analyzes the integrity of the data or information being received at the receiving programmable controller and selects the cable based on the integrity of the data or information being received, rather than incoming signal strength.

SUMMARY OF THE INVENTION

The present invention solves the problems associated with the prior art by providing a dedicated modem for each programmable controller and each processor within a programmable controller in the communication system. The modems are utilized to interconnect the programmable controllers and/or processors via pairs of coaxial cables. Each modem is provided with three transceivers, one transceiver for each cable within a pair of cables and one transceiver for interconnecting the modem to a programmable controller or processor within a programmable controller. Each transmission from a programmable controller or processor within a programmable controller is simultaneously transmitted via its associated modem over a pair of cables to all of the other programmable controllers and processors within programmable controllers in the communication system.

Each transmission is comprised of a series of flag characters at the beginning of the transmission, the data or information being transmitted and another series of flag characters at the end of the transmission. The modem associated with each of the other programmable controllers or each of the other processors within programmable controllers in the system receive the transmitted data or information. The modems decode the signal from each of the pair of cables, and pass the decoded signal, if it is substantially defect-free, from the main cable to its associated programmable controller or associated processor within a programmable controller, via a channel selector. If, however, the signal on the main cable is non-existent or includes a defect, the signal on the other cable is passed to the receiving programmable controller or receiving processor within a programmable controller via the channel selector. In this manner, true redundancy exists with respect to communication between the modems, the associated programmable controllers and the processors within programmable controllers.

DESCRIPTION OF THE PREFERRED EMBODIMENT

Figure 1:
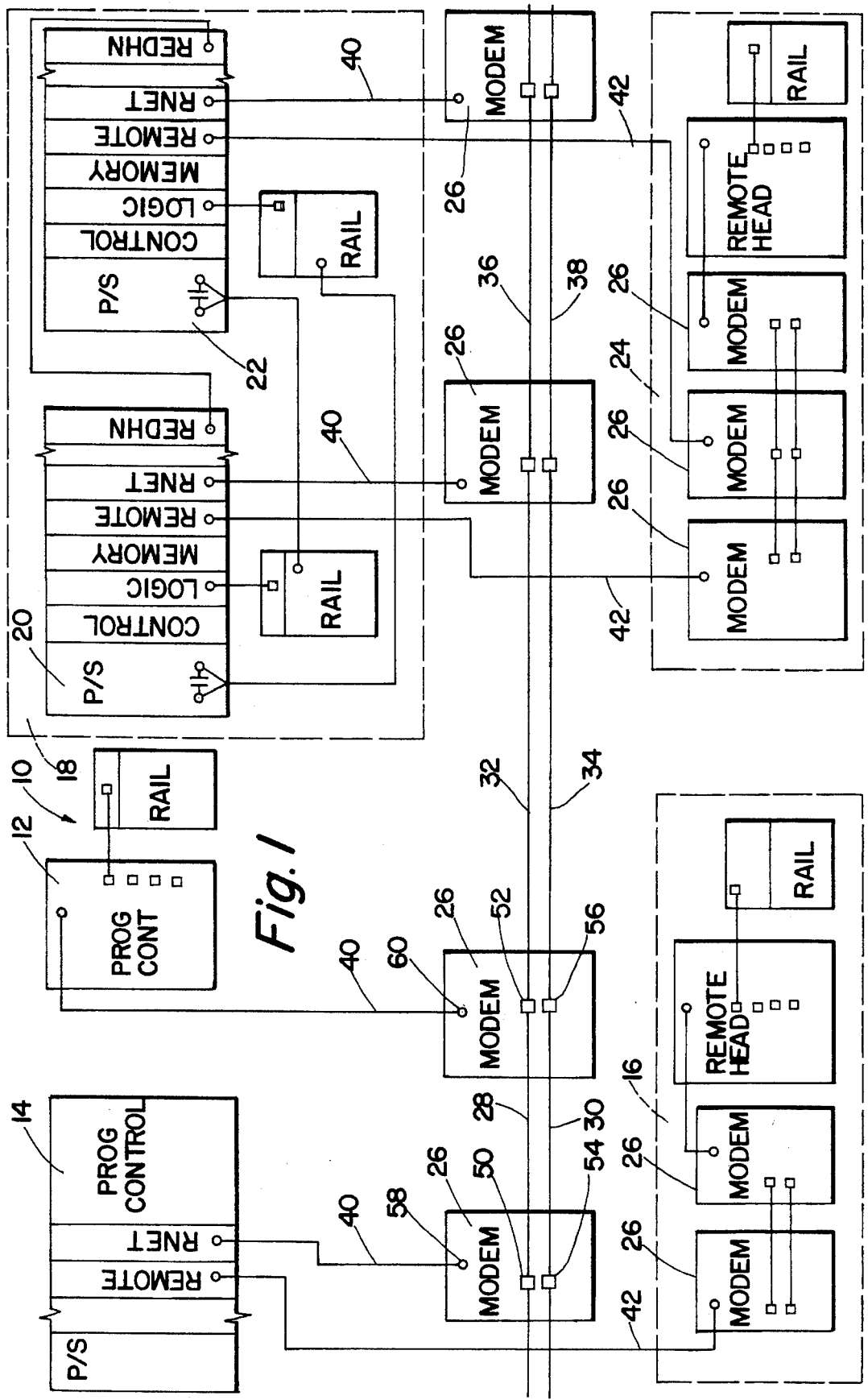
FIG. 1 is a schematic diagram of a communication network utilizing the present invention and showing the interconnection of a plurality of programmable controllers, each having at least one dedicated modem, via a plurality of coaxial cables.

Referring now to the drawings where the illustrations are for the purpose of describing the preferred embodiment of the present invention and are not intended to limit the invention described herein, FIG. 1 is a schematic diagram of a network 10 including a plurality of components interconnected in a communication arrangement and utilizing the present invention. The network 10 may include, for example, a programmable controller 12; a programmable controller 14 having remote input/output devices, shown generally by the numeral 16, connected thereto; and a programmable controller 18 including redundant processors 20 and 22, each having remote input/out devices, shown generally by the numeral 24, connected thereto. Each of the foregoing components has a span redundancy modem 26 associated therewith and the components are interconnected via the modems 26 and coaxial cable sections. For example, programmable controllers 14 and 12 are interconnected via their associated modems 26 and two coaxial cable sections, viz., cable sections 28 and 30. Similarly, programmable controller 12 and processor 20 within programmable controller 18 are interconnected via their associated modems 26 and coaxial cable sections 32 and 34. Lastly, processors 20 and 22 within programmable controller 18 are interconnected via their associated modems 26 and coaxial cable sections 36 and 38. Each span redundancy modem 26 is connected to its associated programmable controller or processor within a programmable controller by a cable section 40. Those programmable controllers or processors within a programmable controller that utilize remote input/output devices are connected to same by a cable section 42 and at least one span redundancy modem 26 associated with the remote input/output devices.

The span redundancy modem 26 is a stand-alone unit having its own power supply. In addition, the modem 26 has three transceivers, one transceiver for each channel of communication, Channel A or Channel B, and one transceiver for connecting the modem to its associated programmable controller or processor within a programmable controller. In order to accomplish the necessary communications within a network arrangement, each span redundancy modem 26 is provided with three (3) 75 ohm BNC jack connectors, one connector for attachment to the cable section for Channel A, one connector for attachment to the cable section for Channel B, and one connector for attachment to the cable section 40 which interconnects the modem to its associated programmable controller or processor within a programmable controller. For example, considering the span redundancy modems 26 for programmable controllers 12 and 14, connector 50 on span redundancy modem 26 associated with programmable controller 14 is attached to one end of cable section 28 whose other end is attached to connector 52 on span redundancy modem 26 associated with programmable controller 12. Similarly, connector 54 on span redundancy modem 26 associated with programmable controller 14 is attached to one end of cable section 30 whose other end is attached to connector 56 on span redundancy modem 26 associated with programmable controller 12. Lastly, connector 58 on span redundancy modem 26 for programmable controller 14 is attached to controller 14 via its associated cable section 40. Similarly, connector 60 on span redundancy modem 26 for programmable controller 12 is attached to controller 12 via its associated cable section 40. Similar connections are provided between other span redundancy modems 26 and programmable controllers or processors within programmable controllers in the network 10. Cable section 28 is utilized for transmission of Channel A between span redundancy modems 26 for programmable controllers 12 and 14 and cable section 30 is utilized for transmission of Channel B between same. As will be described hereinafter, true redundancy exists in the foregoing network communication arrangement inasmuch as the same data or information is transmitted over Channels A and B to all of the programmable controllers or processors within programmable controllers in the network 10.

Figure 2:
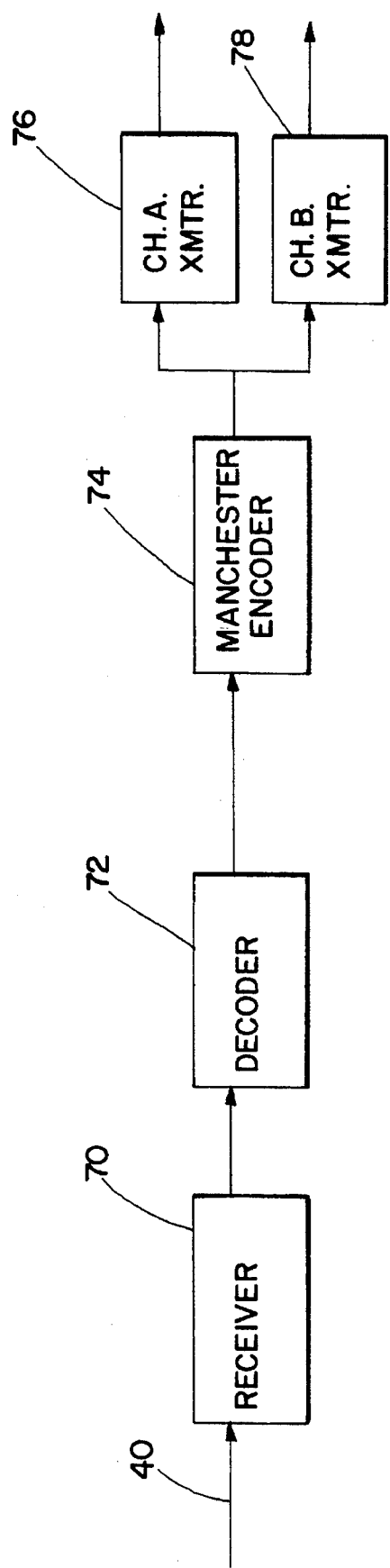
FIG. 2 is a schematic diagram of the transmit path through the modem utilized in the communication network illustrated in FIG. 1.

As previously stated, each span redundancy modem 26 includes three transceivers. Referring now to FIG. 2, the transmit path through a typical modem 26 is illustrated. The transmit path includes a receiver 70 connected, via a cable section 40, to the programmable controller or processor within a programmable controller associated with the particular modem 26, a decoder 72 connected to the output of receiver 70, a Manchester encoder 74 connected to the output of decoder 72 and transmitters 76 and 78 connected to the output of Manchester encoder 74. Transmitter 76 is associated with Channel A whereas transmitter 78 is associated with Channel B. Referring to the previous discussion of the interconnection of span redundancy modems 26 for programmable controllers 12 and 14, the output of transmitter 76 (Channel A) is transmitted over cable section 28 whereas the output of transmitter 78 (Channel B) is transmitted over cable section 30 when either of the span redundancy modems 26 associated with the foregoing cable sections are in the transmit mode.

Figure 3:
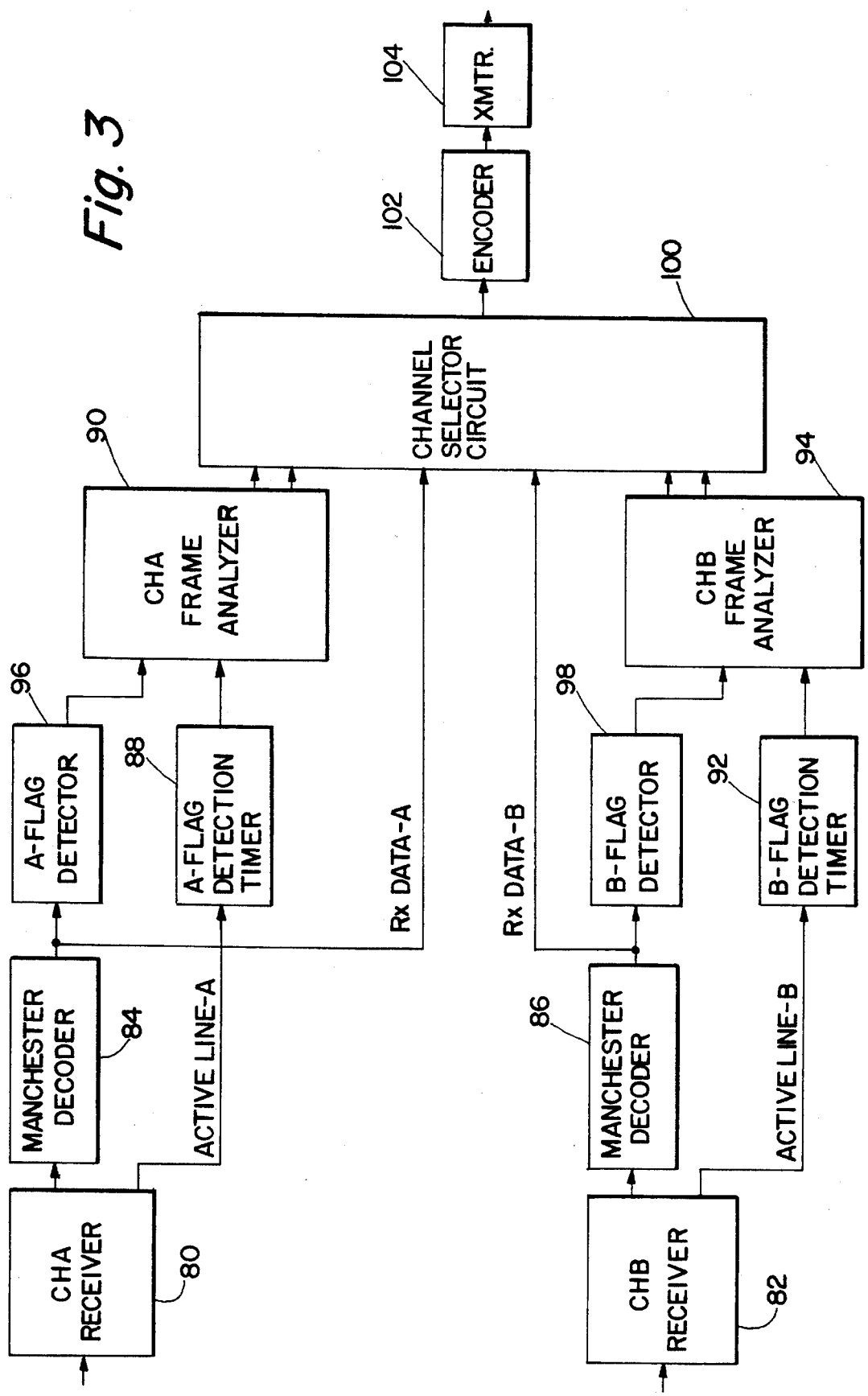
FIG. 3 is a schematic diagram of the receive path through the modem utilized in the communication network illustrated in FIG. 1.

Referring now to FIG. 3, the receive path through a span redundancy modem 26 is illustrated. When a span redundancy modem 26 associated with a pair of cable sections is in the receive mode, both receiver 80 associated with Channel A and receiver 82 associated with Channel B receive the same data or information over their associated cable sections. This data or information is decoded by Manchester decoder 84 which is connected to the output of receiver 80 (Channel A) and by Manchester decoder 86 which is connected to the output of receiver 82 (Channel B). An output (active line__A) of receiver 80 is connected to a flag detection timer 88 whose output is connected to a frame analyzer 90 for Channel A. Similarly, an output (active line__B) of receiver 82 is connected to a flag detection timer 92 whose output is connected to a frame analyzer 94 for Channel B. The output of Manchester decoder 84 is connected to a flag detector 96 whose output is connected to frame analyzer 90. Similarly, the output of Manchester decoder 86 is connected to a flag detector 98 whose output is connected to frame analyzer 94. An output ($R_x$ Data__A) of Manchester decoder 84 (Channel A) and an output ($R_x$ Data__B) of Manchester decoder 86 (Channel B) are also connected to a channel select circuit 100 which is also connected to the outputs of the frame analyzers 90 and 94. The output of channel selector 100 is connected to an encoder 102 whose output is connected to a transmitter 104 which is connected to the programmable controller or processor within a programmable controller to which the span redundancy modem is associated.

Transmissions over Channel A and Channel B are in the form of frames of data or information each having a "flag" as an identifier at the start of the frame. When in the transmit mode, a frame to be transmitted from a programmable controller or a processor within a programmable controller is decoded by decoder 72, encoded by Manchester encoder 74 and then transmitted simultaneously via transmitter 76 (Channel A) and transmitter 78 (Channel B) within its associated span redundancy modem to all of the other programmable controllers or processors within programmable controllers in the network via the cable sections interconnecting same. The receiver portions of the transceivers being utilized are disabled during the foregoing transmission. The receiver 80 (Channel A) and receiver 82 (Channel B) in the span redundancy modem associated with each of the other programmable controllers or processors within programmable controllers in the network receive the frames of data or information via the pairs of cables interconnecting the modems, and decodes same by its associated Manchester decoders 84 and 86, respectively. Each frame of data or information is comprised of a series of flag characters, the data or information being transmitted, and flag characters at the end of a frame. Upon receiving a frame of data or information, receiver 80 (Channel A) and receiver 82 "go active" causing their respective flag detection timers 88 and 92 to transmit a 40μ second timing pulse to frame analyzers 90 and 94, respectively. Flag detectors 96 and 98 review the decoded signals produced by Manchester decoders 84 and 86, respectively, for the existence of a flag character and transmit a signal to their respective frame analyzers 90, 94 upon the occurrence of same. If frame analyzer 90 receives a signal from flag detector 96 indicating the existence of a flag character while receiving the 40μ second timing pulse produced by flag detection timer 88, frame analyzer 90 transmits a signal to channel selector 100. Conversely, if frame analyzer 94 receives a signal from flag detector 98 indicating the existence of a flag character while receiving the 40μ second timing pulse produced by flag detection timer 92, frame analyzer 94 transmits a signal to channel selector 100. As a result of the foregoing process, the channel selector 100 determines which channel will send the subject data or information to the associated programmable controller or processor within a programmable controller. The selected data or information is encoded by encoder 102 and transmitted, via transmitter 104, to the associated programmable controller or processor within a programmable controller. Thus, if there is a loss of data or information on one of the channels, or some noise is present on a channel, the channel selector 100 selects the other channel for transmission of the data or information thereon to the associated programmable controller or processor within a programmable controller. In essence, true redundancy exists throughout the entire network communication arrangement.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. Apparatus for monitoring and selecting signals simultaneously transmitted over a plurality of cables, said apparatus comprising means for receiving said signals transmitted over the plurality of cables; means for detecting an identifying characteristic of each of said signals received by the receiving means; means for producing a pulse in response to the receipt of a signal by the receiving means; means for producing a signal in response to the detection of the identifying characteristic by the detecting means during the occurrence of said pulse; and means for selecting a signal being transmitted over a cable within the plurality of cables; the signal selecting means being responsive to said signal produced by the signal producing means.

2. The apparatus as defined in claim 1 wherein said pulse has a pre-determined duration.

3. The apparatus as defined in claim 1 further including means for transmitting signals simultaneously over the plurality of cables.

4. The apparatus as defined in claim 3 further including means for encoding said signals, the encoded signals being simultaneously transmitted by the transmitting means over the plurality of cables.

5. Apparatus for monitoring and selecting signals simultaneously transmitted over a plurality of cables, said apparatus comprising means for receiving said signals transmitted over the plurality of cables; means for decoding the signals received by the receiving means, the signal decoding means producing decoded signals representative of said signals being transmitted over the plurality of cables, each of said decoded signals including an identifying characteristic; means for detecting the identifying characteristic of each of said decoded signals; means for producing a pulse for a pre-determined period of time in response to the receipt of a signal by the receiving means; means for producing a signal in response to the detection of the identifying characteristic by the detecting means during said pre-determined period of time; and means for selecting a signal being transmitted over a cable within the plurality of cables in response to the signal produced by the signal producing means.

* * * * *